Figure 4:
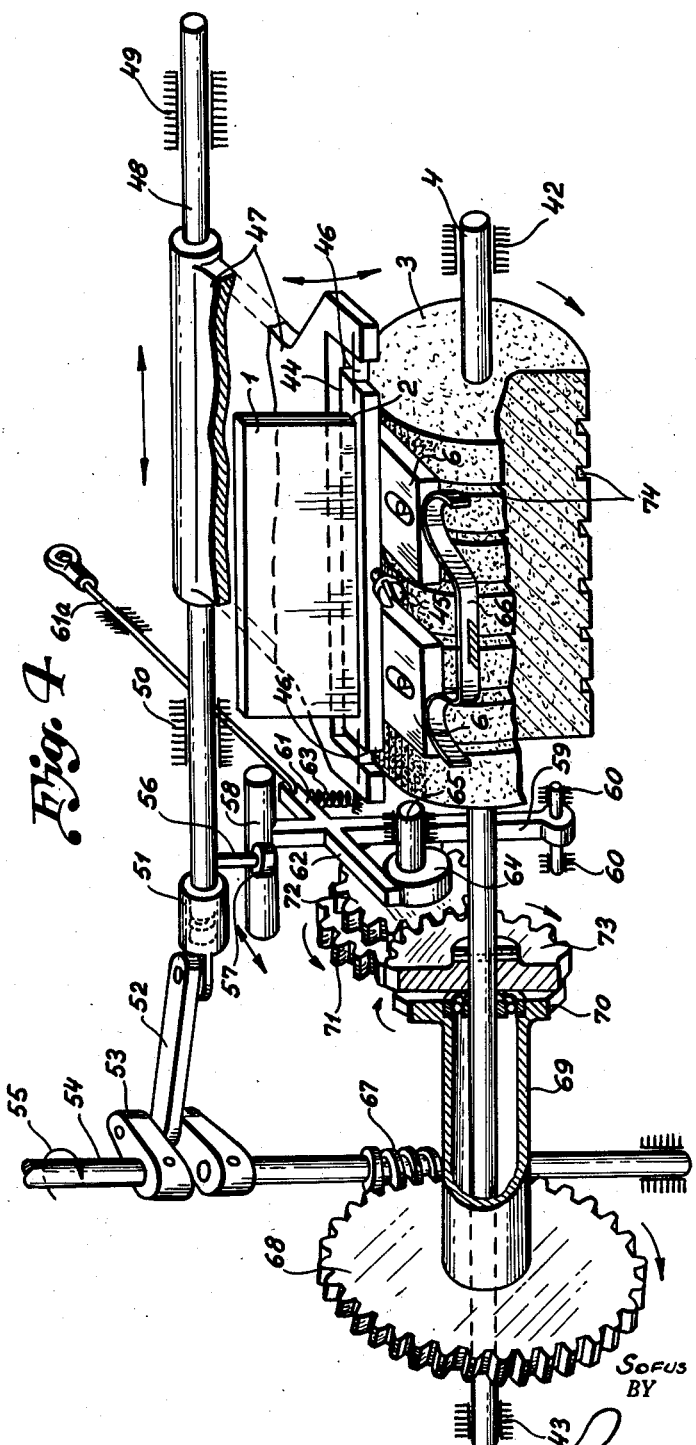

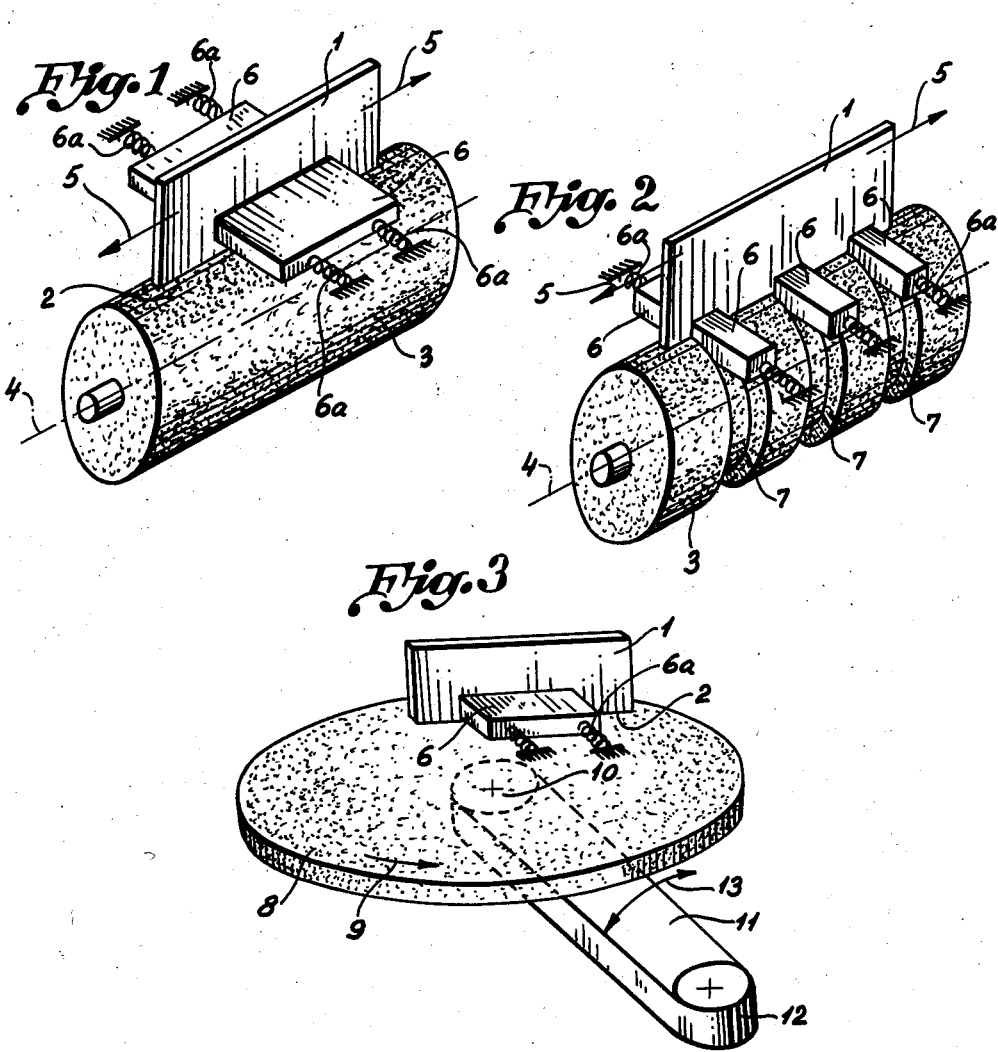

United States Patent Office 2,791,073
Patented May 7, 1957

2,791,073

METHOD OF GRINDING SCRAPER BLADES

Sofus Valdemar Grum-Schwensen, Alleroed, Denmark

Original application November 5, 1953, Serial No. 390,337. Divided and this application December 29, 1954, Serial No. 478,245

2 Claims. (Cl. 51—285)

This invention relates to an improved method of grinding scraper blades having at least one edge surface to be ground, and this application is a division of my copending application, Serial No. 390,337, filed November 5, 1953.

Amongst the requirements for such grinding methods the most important is that the finished blades have sharp cutting edges without nicks or the like, and when a grinding device is used, operation of this grinding device must be so simple that a single man without special training can complete the grinding of so great a number of scraper blades per time unit that the use of the device is profitable.

In the only hitherto known grinding devices for scraper blades each scraper blade is first set-up in a blade holder or carrier, one edge surface is ground, the blade is then inverted in the carrier and the opposite edge surface is ground. After this, the blade has to be set-up in another part of the grinding device where the side faces of the blade are ground one by one in order to take off burrs formed by the grinding of the edge surfaces, and this latter setting-up necessitates thus two more operations. Owing to these many operations the grinding of scraper blades becomes altogether so complicated a matter that most often blades are ground by hand after the same method as used in the device stated.

Further, either the grinding of a scraper blade takes place in a grinding device of the type hitherto used or by hand, very often the scraper blade can only be used a comparatively short time before regrinding is necessary.

An object of this invention is to provide a method of grinding scraper blades which will enable them to stay sharp for a long period of time.

Another object of this invention is to provide a method of grinding scraper blades which makes it possible in a single operation and in a simple manner to obtain sharp cutting edges without nicks or the like at least at one edge surface of a scraper blade.

A further object of this invention is to provide a method of grinding scraper blades having at least one edge surface to be ground, by which several times in succession the scraper blade is ground alternately by means of an edge surface grinding tool on the edge surface and by means of at least two side face grinding members on each side face of the scraper blade at the side edges of the edge surface. By this method is attained partly that the work of setting-up the scraper blades is substantially diminished, and partly that the grinding itself is improved because the alternate grinding of the edge surface and the side faces will produce a sharper and more even cutting edge than it hitherto has been possible to produce by the hitherto used grinding methods.

With these and other objects in view, the invention resides in the novel method and the novel features of construction as more fully hereinafter set forth.

In the accompanying drawings forming a part of this specification and in which like numerals are employed to designate like parts throughout the same.

Figs. 1 to 3 show schematically and in perspective views the principle of the invention in three different embodiments of the invention, and Fig. 4 shows an embodiment of a grinding machine operating on the principle according to Fig. 1.

Referring to Fig. 1, a scraper blade indicated by 1 is placed with its edge surface adjacent the surface of an edge surface grinding tool 3 formed as the surface of a cylinder rotatable on its axis 4. Owing to the rotation of this cylinder 3 the edge surface 2 of the scraper blade 1 is ground when the scraper blade is pressed against the grinding tool 3. To avoid wear of the grinding tool 3 along the same part thereof, either the grinding tool 3 or the scraper blade 1 must be axially displaceable as indicated by arrows 5 as regards the scraper blade 1. Somewhat above the grinding cylinder 3 and on either side of the scraper blade a stationary side face grinding member 6 is arranged and is pressed against the side faces of the scraper blades. When the scraper blade 1 has been ground for some time along its edge surface 2, it is raised by hand or by means of members not disclosed in this figure, so that it is displaced such a distance above the cylinder 3 that the side faces adjacent the edge surface lie between the grinding surfaces of grinding members 6 and are ground for taking off the burrs which were formed during the grinding of the edge surface. When the scraper blade has been ground a short while in this position, it is again moved down against the cylindrical grinding tool 3 for renewed grinding of the edge surface, and several times in succession these operations are alternated until the grinding operation is completed. After this, the scraper blade is inverted and the opposite edge surface is treated in the same manner.

In the type of device disclosed in Fig. 2 there is likewise used a cylindrical edge surface grinding tool 3, and the scraper blade is also in this instance reciprocated parallel to the cylinder axis 4. The surface of cylinder 3 is provided with a number of annular grooves 7, each of which is engaged by two side face grinding members 6 in such a manner that there is one grinding member 6 on either side of the scraper blade with its grinding surface abutting the side faces of the scraper blade 1 adjacent the edge surface 2. By means of this construction it is not necessary to raise the scraper blade 1 from the cylindrical grinding member 3, because grinding of parts of the edge surface takes place simultaneously with grinding of parts of the side faces at other parts of the edge surface, so that every part of the edge surface of the scraper blade is ground several times in succession alternately along the edge surface and along the side faces. In this manner of construction, however, the grinding members 6 are subjected to uneven wear and therefore often have to be trued up. In the embodiment shown in Figs. 1 and 2 as well as in the embodiments described hereinafter, the grinding members 6 are preferably pressed against the scraper blade by means of springs 6a.

In the type of device illustrated in Fig. 3 the scraper blade 1 lies with its edge surface 2 on an edge surface grinding tool 8 shaped as a flat disc which rotates in the direction indicated by an arrow 9. The shaft 10 of this grinding disc is journalled in the one end of an arm 11, the other end 12 of which is journalled to oscillate on a stationary shaft (not shown). The arm 11 may, as indicated by arrows 13, perform a reciprocating oscillation so that the greater part of the grinding surface of disc 8 may contact the edge surface 2 of the scraper blade, and thus distribute wear of the disc surface. Also in this instance there is arranged, somewhat above the surface of the grinding disc 8, a grinding member 6 on either side of the scraper blade 1 abutting the side faces thereof, and these grinding members are, as in every case when the scraper blade is raised from the grinding disc 8 to a position in which the side faces adjacent the edge surface are opposite the grinding surfaces of the grinding members 6, reciprocated parallel to the scraper blade for grinding the side faces adjacent the edge surface 2.

An embodiment of a grinding device according to the principle indicated in Fig. 1 is shown partly schematically and in perspective view in Fig. 4. This device is provided with a cylindrical edge surface grinding tool 3 mounted on a shaft 4 rotatably journalled in bearings 42 and 43. Above the grinding tool 3 is arranged a scraper blade carrier or holder 44 in which a scraper blade 1 may be clamped by means of a clamp screw 45.

The carrier 44 is by means of leaf springs 46 connected to supporting member 47 attached to a driving rod 48. This rod is rotatably journalled and longitudinally displaceable in stationary bearings 49 and 50 disposed on a frame or support only shown by symbols. The end of rod 48 at the left-hand side of Fig. 4 is engaged for limited rotation in a bushing 51 attached to the one end of a connection rod 52, the other end of which is attached to a crank 53 attached to a driving shaft 54 rotatably journalled in the frame. This shaft 54 is rotated by any appropriate means (not shown) in the direction indicated by an arrow 55, thus imparting to the driving rod 48 a reciprocal motion in its bearings 49 and 50.

To the driving rod 48 is attached a pin 56 carrying a roller 57 disposed opposite an elongated abutment member 58. This member 58 has such a length that it may engage the roller 57 irrespective of the displacement of the driving rod 48. The abutment member 58 is mounted on the upper end of a rod 59, the lower end of which is oscillatorily journalled in bearings 60, 60 in the frame, the rod being further provided with two laterally extending arms 61 and 62. The one arm 61 is acted upon by a pressure spring 63 which continuously endeavours to hold the abutment member 58 against the abutment roller 57. The other arm 62 lies over a cam disc 64 attached to a shaft 65 rotatably journalled in the frame. The rotation of shaft 65 produced in a manner described later, causes the arm 62 to engage an eccentric portion of a cam disc 64 to the effect that the abutment member 58 is thrust away from the abutment roller 57. This eccentric portion of cam disc 64 is so shaped that the abutment member 58 only engages the abutment roller 57 a short time during each rotation performed by the cam disc.

When abutment member 58 engages abutment 57, the driving rod 48 is oscillated in such a manner that the supporting member 47 swings upwardly, thus raising the scraper blade from the grinding tool 3. This oscillation is so great that the edges of the lower edge surface 2 of the scraper blade 1, after the blade is swung away from the grinding tool 3, is raised between side face grinding members 6 positioned a short distance above the grinding tool 3 and displaceable towards the side faces of the scraper blade, against which they are held resiliently by means of a spring 66. There are two grinding members 6 on either side of the scraper blade in the embodiment illustrated, but the table or the like support in which they are supported and the means for holding them in position and guiding them are not shown.

The means for operating grinding tool 3 and cam disc 64 comprise a worm 67 mounted on shaft 54 and engaging a worm wheel 68 attached to a tubular shaft 69 rotatably journalled on shaft 4. This tubular shaft carries furthermore a gear wheel 70 meshing with another gear wheel 71 which has a few more teeth than gear wheel 70. Gear wheel 71 is attached to shaft 65 and thus operates cam disc 64. Shaft 65 carries furthermore a gear wheel 72 having a few teeth less than gear wheel 71 and meshing a gear wheel 73 on shaft 4, so that this gear wheel 73 operates the shaft 4.

Thus, this gearing causes partly that the grinding tool 3 and the cam disc 64 are rotated at a speed considerably slower than the rotational speed of the driving shaft 54, and consequently slower then the reciprocations of the driving rod 48, and partly that cam disc 64 is rotated at a speed different, but not much different, from the speed of the grinding tool 3. The result of this is that the scraper blade 1 is raised from the edge surface grinding tool 3 and again moved to contact this member at parts thereof which differ for each rotation performed by the grinding tool 3. In this manner is attained that the wear on the grinding tool is evenly distributed along its entire surface.

As it is important that the oscillations performed by the scraper blade about the axis of rod 48 always are of proper value, it is possible forcibly to move abutment member 58 away from abutment roller 57 irrespective of the position of cam disc 64. The means may e. g. as shown consist of a pull wire 61a connected to arm 61. Thus, when a scraper blade 1 is to be inserted in position, it is possible to make sure that the scraper blade carrier 44 is always in the same position in relation to grinding tool 3, which position is determined by the means for limiting the oscillations of the driving rod 48 in relation to the bushing 51. The scraper blade 1 can thus always be inserted in exactly the same position.

The grinding tool 3, in the embodiment shown in Fig. 4, is provided with a number of annular grooves 74, which have been found to produce a more uniform grinding and less wear than would be the case if these grooves were omitted.

What I claim is:

1. The method of mechanically grinding the edge of a tool blade which consists in reciprocating the blade in its own plane in one direction into and out of contact with a moving abrasive surface and between opposed abrasive surfaces yieldingly contacting the opposite blade faces contiguous to the ground edge and at the same time effecting a relative reciprocation of the blade in its own plane and the three abrasive surfaces in a direction transverse to the first-mentioned reciprocation.

2. The method of mechanically grinding the edge of a tool blade which consists in simultaneously reciprocating the blade in its own plane in directions transverse to each other into and out of contact with a rotating abrasive surface and between opposed abrasive surfaces yieldingly contacting the opposite blade faces contiguous to the ground edge.

References Cited in the file of this patent

UNITED STATES PATENTS

| | | |
|---|---|---|
| 417,615 | Webster | Dec. 17, 1889 |
| 1,054,006 | Lentz | Feb. 25, 1913 |
| 1,116,557 | Brightman | Nov. 10, 1914 |
| 1,190,718 | Brunsell et al. | July 11, 1916 |
| 1,457,845 | Lochhead | June 5, 1923 |
| 1,581,919 | Case | Apr. 20, 1926 |
| 1,594,246 | Dechert | July 27, 1926 |
| 1,915,477 | Sheehan | June 27, 1933 |
| 2,161,115 | Walstrom | June 6, 1939 |